(12) United States Patent
Shaik

(10) Patent No.: US 12,398,699 B2
(45) Date of Patent: Aug. 26, 2025

(54) WIND HARNESS FOR A VEHICLE

(71) Applicant: FCA US LLC, Auburn Hills, MI (US)

(72) Inventor: Azad Mohammed Shaik, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/536,670

(22) Filed: Dec. 12, 2023

(65) Prior Publication Data

US 2025/0188905 A1 Jun. 12, 2025

(51) Int. Cl.
| | | |
|---|---|---|
| F03D 9/32 | (2016.01) | |
| F03D 3/04 | (2006.01) | |
| F03D 9/11 | (2016.01) | |

(52) U.S. Cl.
CPC ............. F03D 9/32 (2016.05); F03D 3/0427 (2013.01); F03D 9/11 (2016.05); *F05B 2240/941* (2013.01)

(58) Field of Classification Search
CPC . F03D 9/11; F03D 9/32; F03D 3/0427; F05B 2240/941
See application file for complete search history.

(56) References Cited

U.S. PATENT DOCUMENTS

| | | | |
|---|---|---|---|
| 5,680,032 A | 10/1997 | Pena | |
| 5,850,108 A | 12/1998 | Bernard | |
| 6,138,781 A * | 10/2000 | Hakala | F03D 9/25 |
| | | | 180/2.2 |
| 6,897,575 B1 | 5/2005 | Yu | |
| 7,135,786 B1 | 11/2006 | Deets | |
| 7,492,053 B2 | 2/2009 | Fein et al. | |
| 7,652,389 B2 | 1/2010 | Farmer | |
| 7,665,553 B2 | 2/2010 | Tabe | |
| 7,665,554 B1 | 2/2010 | Walsh | |
| 7,789,182 B2 | 9/2010 | Bradley et al. | |
| 7,808,121 B1 | 10/2010 | Glynn | |
| 7,868,476 B2 | 1/2011 | Baca et al. | |
| 8,098,040 B1 | 1/2012 | Botto | |
| 8,253,262 B1 | 8/2012 | Kiler | |
| 8,371,401 B1 | 2/2013 | Illustrato | |
| 8,436,485 B1 | 5/2013 | Smith | |
| 8,710,691 B2 | 4/2014 | Haddad | |
| 8,791,586 B2 | 7/2014 | Ortiz et al. | |
| 8,967,302 B2 | 3/2015 | Tran | |
| 9,103,317 B2 | 8/2015 | Garcia | |
| 2002/0153178 A1 * | 10/2002 | Limonius | B60L 8/003 |
| | | | 180/2.2 |
| 2003/0155464 A1 | 8/2003 | Tseng | |
| 2004/0084908 A1 | 5/2004 | Vu | |
| 2007/0108775 A1 | 5/2007 | McDavid | |
| 2007/0163829 A1 | 7/2007 | Ellis | |
| 2008/0272603 A1 * | 11/2008 | Baca | B60L 53/52 |
| | | | 180/2.2 |

(Continued)

*Primary Examiner* — Sean Gugger

(74) *Attorney, Agent, or Firm* — Jeremy J. Klobucar

(57) ABSTRACT

A wind harness for a vehicle has a plurality of troughs positioned substantially parallel to one another. A plurality of openings is formed in a bottom of each trough so that is the troughs received air flow, it is directed by the troughs to the plurality of openings. A plurality of ducts with first ends coupled with the trough duct openings. The plurality of ducts has a second end so that the plurality of ducts directs air flow to a turbines. At least one wind turbine is activated by the air flow to generate electricity for the vehicle.

6 Claims, 1 Drawing Sheet

(56) References Cited

U.S. PATENT DOCUMENTS

| | | | |
|---|---|---|---|
| 2011/0031043 A1 | 2/2011 | Armani et al. | |
| 2011/0100731 A1 | 5/2011 | Hassan | |
| 2012/0299526 A1* | 11/2012 | Lambert | H01M 10/46 |
| | | | 74/DIG. 9 |
| 2013/0328318 A1* | 12/2013 | Ozawa | F03D 9/25 |
| | | | 290/55 |
| 2017/0082092 A1* | 3/2017 | Gaither | F16D 65/847 |
| 2017/0342964 A1* | 11/2017 | Cianflone | F03D 9/32 |

\* cited by examiner

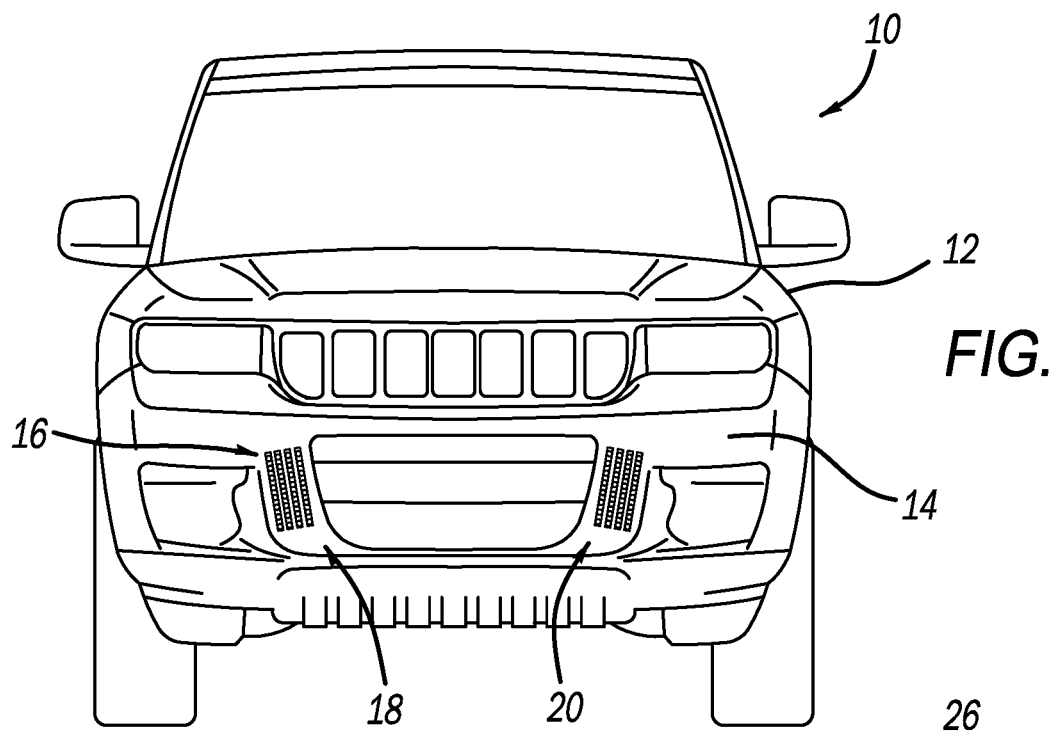
FIG. 1
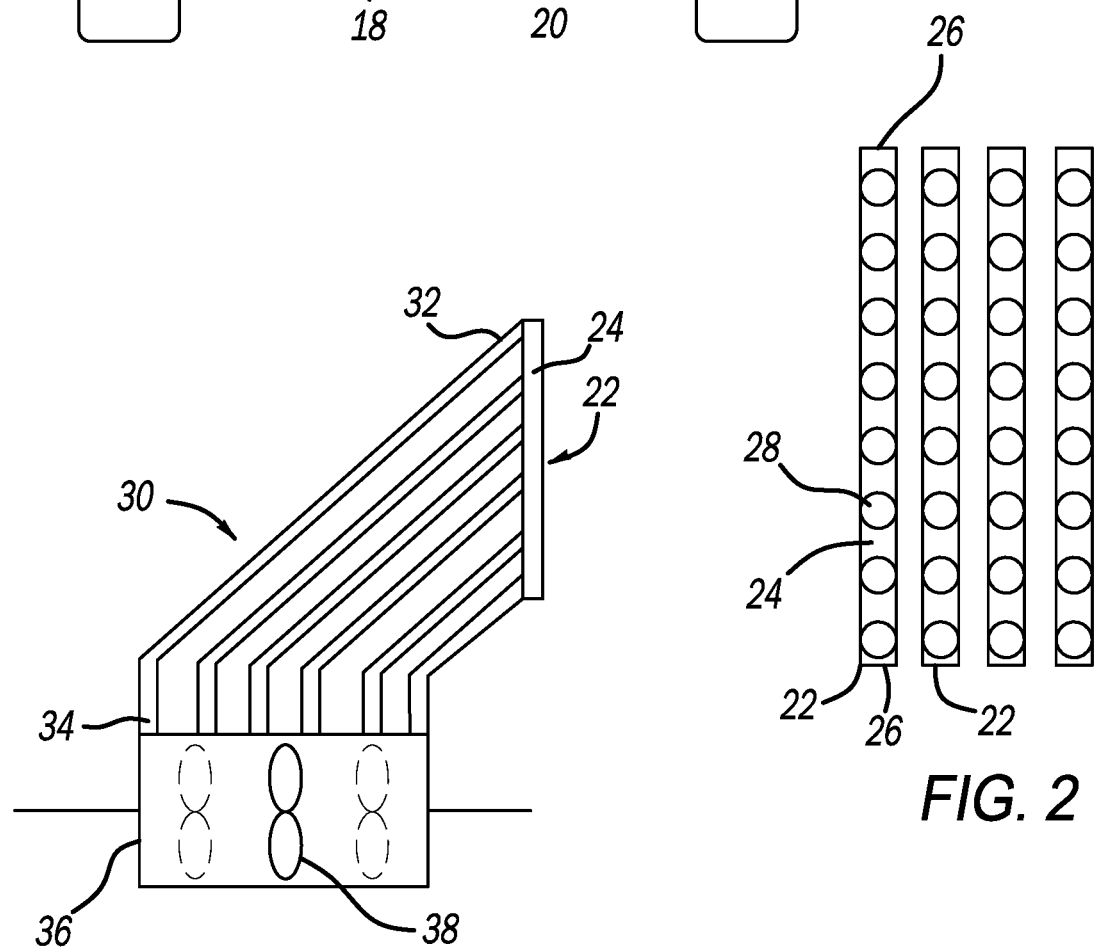
FIG. 2
FIG. 3

WIND HARNESS FOR A VEHICLE

FIELD

The present disclosure relates to vehicles and, more particularly, to a wind harness utilizing wind to produce electrical energy.

BACKGROUND

This section provides background information related to the present disclosure which is not necessarily prior art.

In automotive vehicles, when they are moving, they are constantly exposed to a wind force. Ordinarily, as the vehicle speed increases, the force of the wind around the vehicle increases. Thus, there is wind or air present at a significant speed. Thus, it would be desirable to utilize the wind speed and force to generate electricity via a wind turbine. Several different types of electrical generation devices have been provided in the art. However, these devices have drawbacks when applying them to the vehicle to generate electricity.

Thus, it would be desirable to utilize the wind hitting the vehicle and harnessing the wind to generate electricity. Accordingly, the present disclosure provides a wind harnessing device.

The present device provides a wind harness having a plurality of troughs in the front grille of the vehicle. The harness may include two portions on each side of the grille to enable the air flow into the harness. The harness delivers air flow to turbines, via trough openings, when the car is moving so that the air flows through the harness and generates electricity via the wind turbines.

SUMMARY

This section provides a general summary of the disclosure, and is not a comprehensive disclosure of its full scope or all of its features.

According to a first aspect of the disclosure, a wind harness for a vehicle comprises a plurality of troughs positioned substantially parallel to one another. A plurality of duct openings are formed in a bottom of the troughs so that as the troughs received the air flow, the air flow is directed to the plurality of openings. A plurality of ducts, each has a first end coupled with the trough openings. The plurality of ducts has a second end at a turbine so that the plurality of ducts directs the air flow to the turbines. At least one wind turbine is activated by the air flow to generate electricity for the vehicle. The plurality of troughs are divided into two plurality of troughs. Each plurality of troughs include at least four troughs. Each trough includes at least four openings. Preferably, each trough includes eight openings. The troughs are positioned in a vehicle grille. The two plurality of troughs are positioned on a vehicle grille spaced from one another, each toward opposite ends of the grille. Each plurality of troughs drives a different turbine.

According to a second aspect of the disclosure, a vehicle with a harness comprises a front grille on a body of the vehicle. A wind harness includes a plurality of troughs positioned substantially parallel to one another on the grille. A plurality of duct openings are formed in a bottom of the troughs so that as the troughs received air flow, the air flow is directed to the plurality of openings. The plurality of ducts each has a first end coupled with the trough openings. The plurality of ducts has a second end at a turbine so that the plurality of ducts directs the air flow to the turbines. At least one wind turbine is activated by the air flow for generating electricity for the vehicle. The plurality of troughs are divided into two plurality of troughs. Each plurality of troughs include at least four troughs. Each trough includes at least four openings. Preferably, each trough includes eight openings. The two plurality of troughs are positioned on the vehicle grille spaced from one another, each toward opposite ends of the grille. Each plurality of troughs drives a different turbine.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is an elevation view of a vehicle with a wind harness.

FIG. 2 is an enlarged schematic view of the wind harness in the vehicle.

FIG. 3 is a schematic cross-section view of the wind harness.

Corresponding reference numerals indicate corresponding parts throughout the several views of the drawings.

DETAILED DESCRIPTION

Example embodiments will now be described more fully with reference to the accompanying drawings.

Turning to figures, a vehicle is illustrated and designated with the reference numeral 10. The vehicle 10 includes a body 12 with a front grille 14. The front grille 14 includes a wind harness 16. As illustrated, the wind harness 16 includes a pair of wind receivers 18, 20 positioned on opposing sides of the grille 14. FIG. 2 illustrates an enlarged view of one of the wind receivers 18, 20. The receivers 18, 20 are substantially identical so that the explanation of one will apply to both.

The wind receiver 18, 20 includes a plurality of troughs 22 generally positioned parallel to one another. As illustrated, the troughs 22 are vertically positioned on the grille; however, horizontal or angular positions could be present.

The trough 22 may be a pipe that has been cut in half having a concave surface 24 to receive the air flow. The trough 22 generally has ends 26 that terminate the trough 22 so that the air flows stays in the trough 22.

A plurality of openings 28 are formed in a bottom of the trough 22 to receive the channeled air flow into the openings 28. Generally, there are at least four openings 28 and preferably eight openings, as shown in the schematic depiction, in the bottom of the trough 22. The air flow is directed into the trough 22 which, in turn, is directed to the bottom of the trough 22 where the openings 28 are present. The trough 22 could have angular surfaces directed towards the bottom of the trough with a V-shape or U-shape or truncated V-shape to enable the air flow to be captured by the trough 22 and directed towards its bottom to the openings 28.

Each opening 28 includes a duct 30 secured at the opening 28. The duct first end 32 is coupled with the trough openings 28. The exhaust or second end 34 of the ducts is directed towards a plenum box 36 or the like that houses an air turbine 38. The plurality of ducts 30 extends from the trough openings 28 toward the pelham box 36. The exhaust ends 34 direct the air flow towards the air turbine 38. The air flow is forced through the conduits 30 to accelerate the air flow which causes rotation of the blades of the air turbine 38 which, in turn, generates electricity.

In use, during driving, the air directed at the vehicle is captured by the troughs 22. As the air flow is captured by the troughs 22, it is directed into the openings 28. The conduits 30 direct the air flow from the intake end 32 to the exhaust end 34, positioned adjacent the plenum box 36, directed at the air turbine 38. In the particular embodiment, each wind receiver 18, 20 would be associated with a separate air turbine 38 or a plurality of air turbines in the separate plenum boxes 36. Thus, as the air flow is directed into the plenum box 36, one or more air turbines blade would be rotated to generate electricity from the air turbines 38.

Generally, the plenum boxes 36 are positioned in the body of the vehicle 10. The air plenums are then exhausted to ambient generally below or underneath the vehicle. Thus, the air flow is moved in through the grille of the vehicle, past the turbine 38 and then exits out of the vehicle to ambient.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for harnessing wind for generating electricity for a vehicle, the system being integrated with a front grille of the vehicle and comprising at least one wind receiver configured to be provided on the front grille, the at least one wind receiver including:

a plurality of elongated trough members arranged in parallel, each trough member including a plurality of openings formed therein along a length thereof that permit the wind that enters the respective trough member to pass therethrough;

each trough member is formed of a pipe that is cut in half along a longitudinal length thereof, and the pipe includes a concave surface at which the plurality of openings are provided;

a plurality of ducts in communication with each trough member, and each duct having an intake end attached to the concave surface of the pipe at a respective opening and an exhaust end connected to a plenum box, each of the plurality of ducts in communication with a respective trough member communicating the wind that enters the respective trough member and passes through the plurality of openings of the respective trough member to the plenum box; and at least one turbine positioned in the plenum box and configured to be rotated by the wind that is fed to the plenum box by the plurality of ducts.

2. The system according to claim 1, wherein the front grille includes a pair of the wind receivers on opposing sides of the front grille.

3. The system according to claim 1, wherein the plenum box includes a plurality of the turbines.

4. The system according to claim 1, wherein the plurality of troughs are configured to capture the wind while the vehicle is in motion and direct the wind into the plurality of openings and into the plurality of ducts.

5. The system according to claim 4, wherein the plurality of ducts are configured to accelerate an air flow of the wind before the wind enters the plenum box.

6. The system according to claim 1, wherein each pipe includes opposing ends that terminate the trough to maintain air flow of the wind within the trough.

* * * * *